United States Patent [19]
Gillow et al.

[11] 3,733,536
[45] May 15, 1973

[54] CURRENT SENSOR FOR LOW PASS FILTER

[75] Inventors: Albert V. Gillow, Berkshire; Wendell P. Marple, Vestal, both of N.Y.

[73] Assignee: International Business Machines Corporation, Armonk, N.Y.

[22] Filed: June 5, 1972

[21] Appl. No.: 259,938

[52] U.S. Cl. .................................. 321/10, 324/127
[51] Int. Cl. ................................................ H02m 1/14
[58] Field of Search .................. 321/10; 324/126, 324/127, 128; 328/162, 165, 167; 317/53

[56] References Cited

UNITED STATES PATENTS 1,733,232  10/1929  Miessner .......................... 321/10 X
2,308,013  1/1943   Lee .................................. 321/10 X
2,356,617  8/1944   Rich ................................ 324/128 X
2,954,523  9/1960   Rosenstock ..................... 324/127 X

*Primary Examiner*—James D. Trammell
*Attorney*—Norman R. Bardales et al.

[57] ABSTRACT

A sense winding is included as part of a current sensor which senses the output current of a low pass filter utilized in a high current power supply system. The sense winding is provided with an equivalent number of turns as the filter's inductor has and is magnetically coupled to it in a voltage cancelling relationship. The current sensor provides a sense output signal which is proportional to the filter's output current and derived substantially from the voltage drop across the effective DC resistance of the inductor.

5 Claims, 2 Drawing Figures

3,733,536

CURRENT SENSOR FOR LOW PASS FILTER

BACKGROUND OF THE INVENTION

1. Field of the Invention

This invention is related to current sensors for low pass filters used in high current power supply systems.

2. Description of the Prior Art

High current power supply systems employing a low pass filter are well known in the art. Because of the high current utilized, an appreciable power loss results across the filter inductor due to the presence of the effective DC resistance of the inductor.

In certain cases, it is desirous to provide a current sensor to sense the current passing through the inductor and hence through the load. Heretofore in the prior art, this was accomplished by providing a discrete, i.e. external, resistance in series with the filter inductor and measuring the voltage thereacross. The current passing through the discrete resistance was thus proportional to the current in the filter inductor and/or load. However, this arrangement further increased the power losses to the load due to the presence of the aforementioned external resistance.

SUMMARY OF THE INVENTION

It is an object of this invention to mitigate the power losses in a high current power supply system employing a low pass filter and current sensor.

It is another object of this invention to provide in combination a current sensor and low pass filter in a high current power supply system in which the current sensor coacts with the effective DC resistance of the filter inductor to provide a sense signal which is proportional to the filter's output current.

Accordingly, it is a feature of this invention to provide in a high current power supply system, circuit apparatus comprising in combination low pass filter means which has an inductor with a predetermined number of turns and a capacitor serially connected to the inductor. In addition, current sensor circuit means for sensing the filter's output current is provided and comprises a sense winding which has a number of turns equivalent to the predetermined number of turns of the inductor. The sense winding is magnetically coupled to the filter inductor in a voltage cancelling relationship. The current sensor has sense signal output means which provides a sense signal proportional to the filter's output current and derived substantially from the voltage drop across the effective resistance of the inductor.

The foregoing and other objects, features and advantages of the invention will be apparent from the following more particular description of the preferred embodiment of the invention, as illustrated in the accompanying drawing.

BRIEF DESCRIPTION OF THE DRAWING

In the figures, like elements are designated with similar reference numerals.

DESCRIPTION OF THE PREFERRED EMBODIMENT

Figure 1:
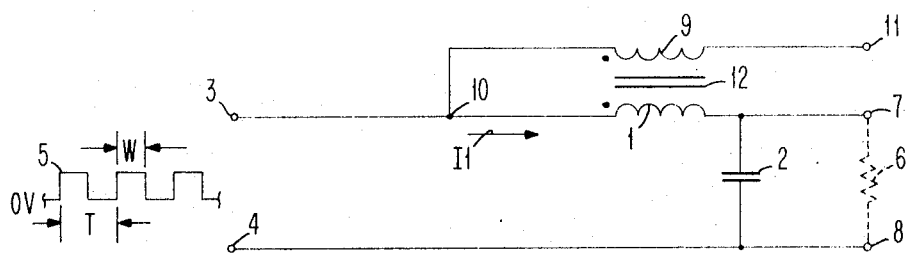
FIG. 1 is a schematic view of a preferred circuit apparatus embodiment of the invention and FIG. 2 is the equivalent circuit diagram of the circuit apparatus of FIG. 1.

Referring to FIG. 1, inductor 1 and capacitor 2 coact as a low pass filter in a high current power supply system. By way of example the input terminals 3, 4 are adapted to be coupled to a source, not shown, of recurring unipolar pulses, e.g. pulse 5 of the idealized waveform partially shown, having a periodicity T and width W. For sake of clarity, the load 6 is shown in dash line form and is connected across the output terminals 7 and 8. As shown, the low pass filter has its inductor 1 in series coupling relationship with the load 6; whereas, the low pass filter's capacitor 2 is connected in parallel coupling relationship with the load 6.

In accordance with the principles of the present invention, current sensor means is provided to sense the filter's output current which is substantially the current $I1$ passing through the inductor 1. More specifically, a sense winding 9, which has an equivalent number of turns as is provided for the filter's inductor 1, is magnetically coupled to the inductor 1 in a voltage cancelling relationship as indicated by the conventional dot polarity shown in FIG. 1. The sense winding 9 is shunted across the inductor 1 by virtue of their respective connections to the node 10. The current sensor is provided with current sense output means shown as terminals 11 and 7, the later terminal being common to the current sensor and filter outputs. In the preferred embodiment, the sense winding 9 and the inductor 1 are wound on a common core 12.

The operation of the apparatus of FIG. 1 will now be described in conjunction with its equivalent circuit diagram shown in FIG. 2. The low pass filter 1, 2 converts the unipolar input pulses present at its input terminals 3, 4 to a DC voltage at the output terminals 7, 8 in a manner well known to those skilled in the art. The filter circuit parameters such as the impedances of the inductor 1 and capacitor 2, as well as the input signal parameters such as pulse amplitude, width, and frequency, govern the DC level and/or ripple content of the DC output voltage.

Figure 2:
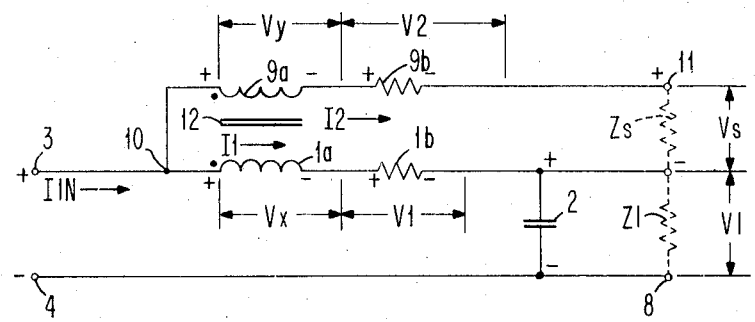

For purposes of explanation, the inductor 1 of FIG. 1 is represented in FIG. 2 by its inductive and effective DC resistance components $1a$ and $1b$, respectively. Likewise, the sense winding 9 of FIG. 1 is represented in FIG. 2 by its inductive and effective DC resistance components $9a$ and $9b$, respectively. The impedances $Zl$ and $Zs$, shown schematically in FIG. 2, represent the load impedance and impedance of the measuring instrument circuit, it being understood that $Zs \gg Zl$.

In accordance with well known circuit theory, the instantaneous voltage loop equation around the loop comprising inductor 1, sense winding 9 and the the measuring instrument circuit $Zs$ is given by the following equation:

$$0 = Vx + V1 - Vy - V2 - Vs. \quad (1)$$

since $|Vx| = |Vy|$, equation (1) may be written as follows:

$$Vs = V1 - V2 \quad (2)$$

Since the impedance $Zs$ is generally much greater than the effective DC resistance $9b$, equation (2) may be reduced, as follows:

$$Vs = V1 = I1 \times R1b \quad (3)$$

where $I1$ = the output filter current
$R1b$ = the resistance value of the effective DC resistance of inductor 1. The output filter current $I1$ is related to the measuring circuit current $I2$ and filter input current $Iin$, as follows:

$$Iin = I1 + I2 \quad (4)$$

From the foregoing, it is readily seen that the output signal $Vs$ is proportional to the voltage drop $V1$ across the effective DC resistance $1b$ of inductor 1 and hence to the current $I1 = V1 \div R1b$ passing through the inductor 1 and/or substantially through the load 6, i.e. the filter output current.

Preferably, the wire size of sense winding 9 is judiciously selected to be of smaller diameter compared to that of the inductor 1 for compactness.

A typical set of circuit parameters is given in the following table:

TABLE 1

| | |
|---|---|
| Capacitor 2 | 2000 μfarads |
| Inductor 1: | |
|     inductance | 15 μhenrys |
|     effective DC resistance | 0.0035 ohms |
|     no. of turns | 10 |
|     AWG SIZE No. | 12 |
| Sense winding 9: | |
|     inductance | 15 μhenrys |
|     effective DC resistance | 0.23 ohms |
|     No. of turns | 10 |
|     AWG SIZE No. | 30 |
| Input parameters: | |
|     pulse amplitude | 15 volts, peak |
|     pulse frequency | 33 kilohertz |
|     pulse width | 10 μsec. |
| Filter Output parameters: | |
|     DC level | 5 volts DC |
|     output current | 20 to 50 amps |
| Sensor Voltage (Vs) | 70 to 175 millivolts |
| Measuring instrument circuit impedance | 100 ohms |

It should be understood that while the invention has been particularly shown and described with reference to a preferred embodiment, it will be understood by those skilled in the art that the foregoing and other changes in form and detail may be made therein without departing from the spirit and scope of the invention.

We claim:

1. In a high current power supply system, circuit apparatus comprising in combination:

low pass filter means having an inductor with a predetermined first number of turns and a capacitor serially connected thereto, said filter providing an output current; and current sensor means comprising sense signal output means and a sense winding having a second number of turns equivalent to said predetermined first number, said winding being magnetically coupled to said inductor in a voltage cancelling relationship, said current sensor means providing a sense signal at said sense signal output means proportional to the filter's said output current and derived substantially from the voltage drop across the effective DC resistance of the inductor.

2. Circuit apparatus according to claim 1 wherein said low pass filter means further comprises filter output means in series and parallel coupling relationships with said inductor and capacitor, respectively.

3. Circuit apparatus according to claim 1 wherein said sense winding is also electrically connected to said inductor.

4. Circuit apparatus according to claim 1 wherein said inductor and said sense winding are wound on a core member.

5. Circuit apparatus according to claim 1 wherein said inductor is formed of a wire conductor of a predetermined first diameter size, and said sense winding is formed of another wire conductor of a predetermined smaller second diameter size.

* * * * *